(12) United States Patent
Wobben

(10) Patent No.: US 7,353,603 B2
(45) Date of Patent: Apr. 8, 2008

(54) METHOD FOR MOUNTING ROTOR BLADES TO A ROTOR HUB OF A WIND POWER INSTALLATION

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/544,473

(22) PCT Filed: Jan. 20, 2004

(86) PCT No.: PCT/EP2004/000368

§ 371 (c)(1),
(2), (4) Date: Feb. 23, 2006

(87) PCT Pub. No.: WO2004/070203

PCT Pub. Date: Aug. 19, 2004

(65) Prior Publication Data

US 2006/0147308 A1    Jul. 6, 2006

(30) Foreign Application Priority Data

Feb. 10, 2003    (DE) .................................. 103 05 543

(51) Int. Cl.
*B21D 53/78* (2006.01)
(52) U.S. Cl. ............... 29/889; 29/889.3; 29/889.4; 29/434; 416/132 B
(58) Field of Classification Search ............ 29/889, 29/889.3, 889.4, 434; 416/1, 117
See application file for complete search history.

(56) References Cited

U.S. PATENT DOCUMENTS

| | | | |
|---|---|---|---|
| 4,008,817 A * | 2/1977 | Johnson | 414/741 |
| 4,439,108 A * | 3/1984 | Will | 416/131 |
| 5,401,138 A | 3/1995 | Mosiewicz | 416/226 |
| 6,364,609 B1 | 4/2002 | Barnes | 416/142 |
| 7,207,777 B2 * | 4/2007 | Bervang | 416/119 |

FOREIGN PATENT DOCUMENTS

| | | |
|---|---|---|
| DE | 100 31 473 C1 | 2/2002 |
| DE | 101 41 928 A1 | 2/2003 |
| DE | 102 00 401 A1 | 7/2003 |
| DE | 102 25 025 A1 | 12/2003 |
| EP | 1 101 936 A2 | 5/2001 |
| JP | 11-82285 | 3/1999 |

* cited by examiner

*Primary Examiner*—David P. Bryant
*Assistant Examiner*—Sarang Afzali
(74) *Attorney, Agent, or Firm*—Seed IP Law Group PLLC

(57) ABSTRACT

A method of mounting rotor blades to a rotor hub which is connected to a pod of a wind power installation, includes the following steps: rotating the rotor hub into a predetermined first position, fitting a rotor blade, rotating the rotor hub by means of the rotor blade into a predetermined second position, and mounting a second rotor blade, wherein the rotation of the rotor hub is effected in the direction of the effect of gravitational force of the first rotor blade which is already mounted. In that way when mounting rotor blades to wind power installations involving a relatively high hub height it is also possible to use a crane which is also sufficient for mounting the rotor hub itself or the pod. Also shown is a rotor blade to be mounted for a wind power installation, the rotor blade having at least one through hole.

4 Claims, 5 Drawing Sheets

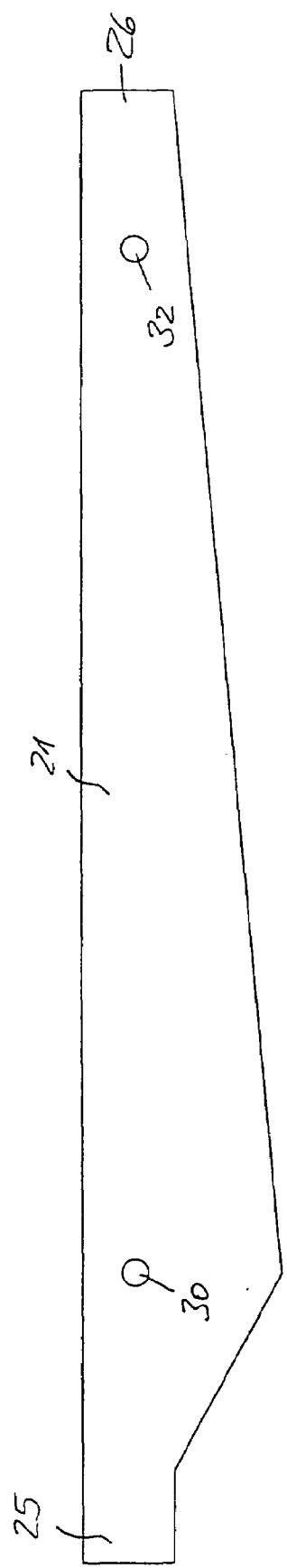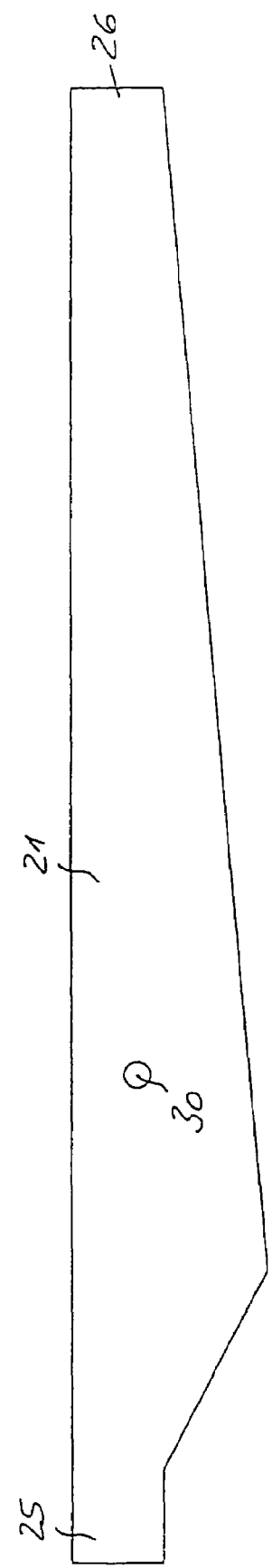

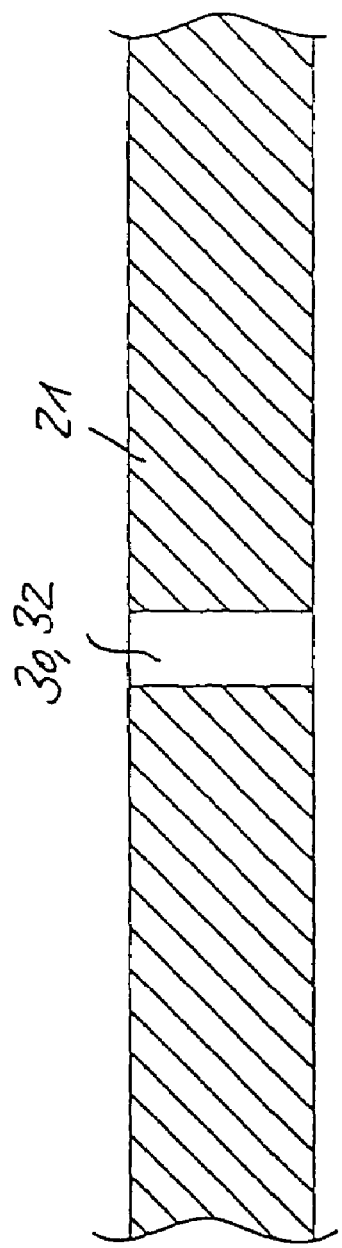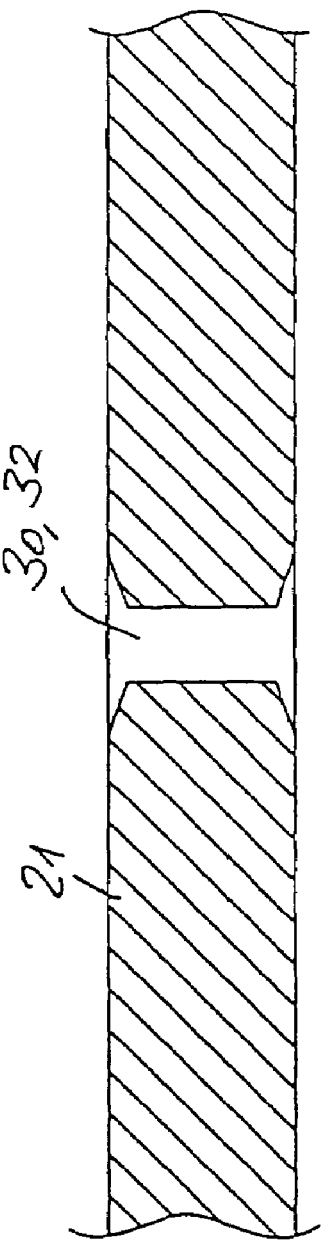

METHOD FOR MOUNTING ROTOR BLADES TO A ROTOR HUB OF A WIND POWER INSTALLATION

BACKGROUND OF THE INVENTION

1. Field of the Invention

The invention relates to a method of mounting rotor blades to a rotor hub which is connected to a pod of a wind power installation, and a rotor blade for a wind power installation.

2. Description of the Related Art

Rotor blades for wind power installations are generally known. With increasing size of the wind power installations and an increasing output power, the size of the rotor blades and the inherent weight thereof is also increasing. Therefore, cranes are required to mount the components, which can transport the loads of increased inherent weight to greater heights. Accordingly the cranes required are also becoming larger.

BRIEF SUMMARY OF THE INVENTION

One object of the invention is to simplify mounting of the rotor blades and to improve the handleability of the rotor blades.

The method of mounting rotor blades to a rotor hub which is connected to a pod of a wind power installation is effected by rotating the rotor hub into a predetermined first position, fitting a rotor blade, rotating the rotor hub by means of the rotor blade into a predetermined second position, wherein the rotation of the rotor hub is effected in the direction of the effect of the gravitational force of the first rotor blade which has already been mounted.

Thus, even when mounting rotor blades to wind power installations in which the hub is at a relatively great height, it is possible to use a crane which is also sufficient for mounting the rotor hub itself or the pod.

In a particularly preferred development of the method according to the invention the pod is rotated through 180 degrees before the second rotor blade is fitted. That procedure permits mounting of the second rotor blade without the crane having to change its location as the rotation of the pod means that the fitment position of the rotor blade is again at the side of the wind power installation at which the crane is set up.

In a further preferred development of the method the rotor hub is rotated by means of the second rotor blade into a further predetermined position, the pod is again rotated through 180 degrees and a third rotor blade is fitted.

That way of mounting the third rotor blade is also possible without a change in the location of the crane and the rotor blades can be fitted in a time-saving manner by virtue of saving on the complicated and expensive operation of changing the location of the crane.

In order to promote the rotary movement of the hub in a particularly simple and effective manner, the crane can engage the rotor blade and particularly preferably a through hole in the rotor blade and thus slow down the rotary movement of the rotor blade in the direction of the gravitational force by means of an oppositely directed force. In that way the rotation can be securely controlled and influenced in a simple manner.

The invention also relates to a rotor blade for a wind power installation.

In order to improve the handleability of the rotor blade, the rotor blade has at least one through hole in the rotor blade at a predetermined position. That has the advantage in particular that handling means which can engage through the rotor blade are faster and more secure in use than the known handling procedure using straps and lashing cables.

In a preferred embodiment the rotor blade has a through hole extending substantially perpendicularly to the longitudinal axis of the rotor blade. By virtue thereof, in accordance with the orientation of the through hole in the rotor blade, that rotor blade can be handled in a substantially horizontal position or in a substantially vertical position.

In a particularly preferred feature the through hole extends between the suction side of the rotor blade and the pressure side thereof and thus permits handling of the rotor blade in a substantially horizontal position which is comparable to the feathered position. In that case the rotor blade affords the smallest possible surface area for the wind to act thereon and is thus naturally also exposed to the influence thereof to the minimum possible extent.

In a particularly preferred development of the invention the rotor blade, at least one predetermined position on the longitudinal axis thereof, has two mutually crossing through holes which extend perpendicularly to the longitudinal axis of the rotor blade and which permit flexible handling of the rotor blade in dependence on for example local factors.

Further advantageous embodiments are set forth in the appendant claims.

BRIEF DESCRIPTION OF THE SEVERAL VIEWS OF THE DRAWINGS

The invention is described in greater detail hereinafter with reference to the Figures in which:

FIG. 1 shows a side view of a first embodiment of a rotor blade according to the invention.

FIG. 2 shows a side view of an alternative embodiment of a rotor blade according to the invention.

FIG. 3 shows a simplified cross-sectional view of a rotor blade portion having a through hole.

FIG. 4 shows a simplified cross-sectional view of a rotor blade portion according to the invention with an alternative embodiment of the through hole.

DETAILED DESCRIPTION OF THE INVENTION

Figure 5:
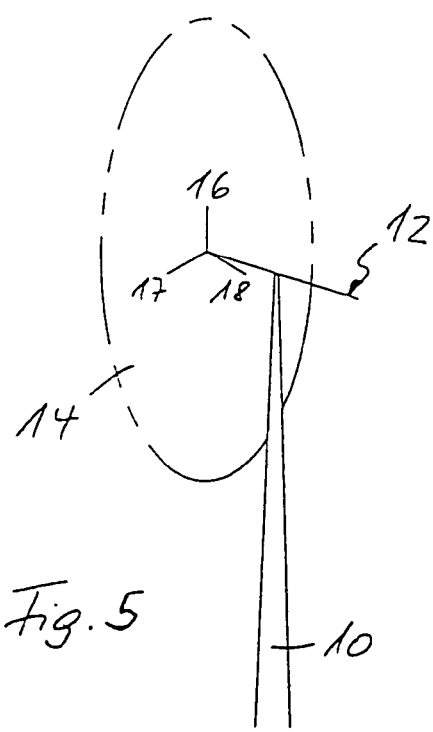
FIG. 5 shows the starting situation in the method according to the invention of mounting the rotor blade.

The plan view in FIG. 1 is a simplified view of the rotor blade 21. The rotor blade 21 has two through holes 30, 32 between the rotor blade root 25 and the rotor blade tip 26 in its longitudinal direction. The through hole 32 is provided in the region of the rotor blade tip 26 while the through hole 30 is disposed in the region near the rotor blade root. In this respect those positions are so established that safe and secure handling of the rotor blade upon mounting thereof to a rotor hub of a wind power installation is guaranteed. The positions for the holes 30, 32 are established having regard to a connection in relation to the load-bearing structure of the rotor blade 21.

FIG. 2 shows an alternative embodiment of the rotor blade 21 with only one through hole 30. This single through hole 30 is appropriately arranged at the centre of gravity of the rotor blade so that the blade can also be safely handled with a handling means. In this case also naturally a connection to the load-bearing structure is taken into consideration.

Further embodiments with more than two through holes are also possible.

FIGS. 3 and 4 show by way of example alternative embodiments of the through holes.

FIG. 3 shows a cylindrical through hole 30, 32 which can be closed by suitable cover members.

FIG. 4 shows a through hole 30, 32 which is also cylindrical in a central portion, but the end portions of the through hole 30, 32, which are adjacent to the surfaces of the rotor blade 21, are enlarged. That enlargement permits improved fitment of cover members which close the through hole 30, 32 in order on the one hand to prevent the ingress of dirt and moisture and on the other hand in order to prevent the flow at the rotor blade from being influenced by the hole by the cover members being inserted flush into the surface. Different per se known possible ways such as for example an undercut configuration, a screwthread and so forth are to be considered for the purposes of fixing such a cover member (not shown).

FIG. 5 shows the starting situation of the method according to the invention for fitting rotor blades to the rotor hub of a wind power installation. This preferably involves using rotor blades with through holes, as shown in FIGS. 1 and 2. Therein and in following FIGS. 5-13 the components required to describe the invention are illustrated in greatly simplified form. In that respect reference 10 denotes the pylon of a wind power installation, 12 indicates the orientation of the pod, 14 represents the rotor circle, 16, 17 and 18 give the orientation of the rotor blade connections, and 21, 22 and 23 denote fitted rotor blades.

For the purposes of mounting the rotor blades to the rotor hub of the pod of a wind power installation, handling means are fixed in the through holes 30, 32 in order to be able to convey the rotor blades safely upwardly to the rotor hub by means thereof and by means of a crane. As the through holes extend between the suction side and the pressure side of the rotor blade, the rotor blades can be safely handled in a horizontal position. The provision of the above-described through holes in the rotor blades considerably simplifies the method described hereinafter of mounting those rotor blades.

In FIG. 5 the rotor circle 14, in the viewing direction, is disposed behind the pylon 10 of the wind power installation and the rotor blade connections 16, 17, 18 are disposed in the positions at 12 o'clock, 4 o'clock and 8 o'clock.

Figure 6:
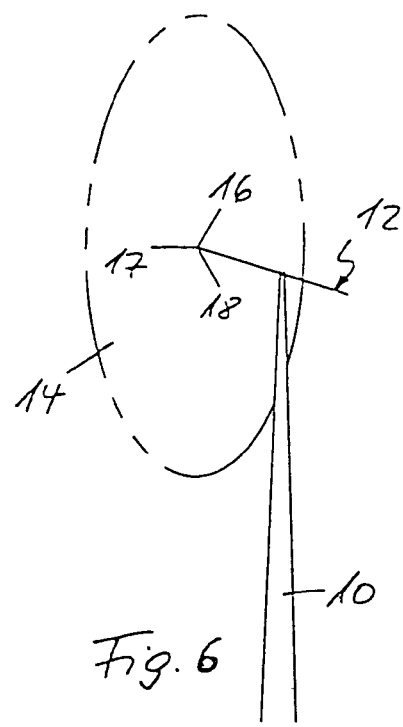
FIG. 6 shows the first step of the method according to the invention.

In the first method step the rotor hub is now moved into a predetermined position. This is shown in FIG. 6. What is essential in this respect is that the rotor blade connection 17 is now in the 9 o'clock position. Accordingly the rotor blade 16 is now in the 1 o'clock position and the rotor blade connection 18 is in the 5 o'clock position.

The orientation of the rotor blade connection 17 which is achieved in that fashion now makes it possible for a rotor blade 21 to be fitted to that rotor blade connection, in a horizontal orientation. For that purpose the rotor blade is arrested in the desired position. That arresting action is presupposed for the purposes of further description hereinafter and is not explicitly mentioned any further.

Figure 7:
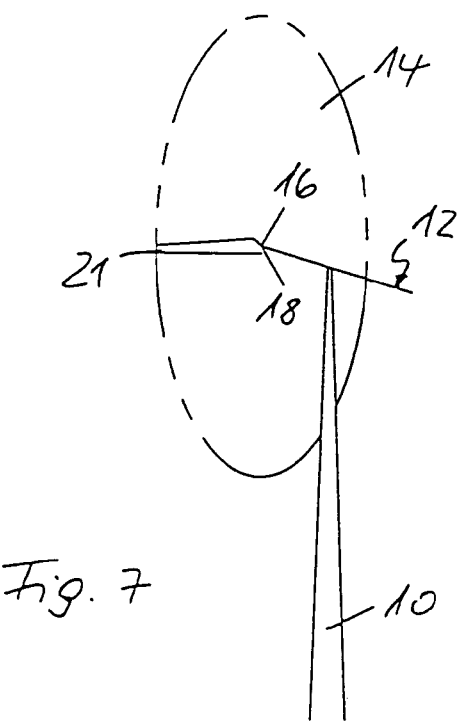
FIG. 7 shows the second step of the method according to the invention.

The situation after mounting of the first rotor blade 21 is shown in FIG. 7. There the rotor blade 21 is in the 9 o'clock position while the rotor blade connections 16 and 18 are in the 1 o'clock and 5 o'clock positions respectively.

Figure 8:
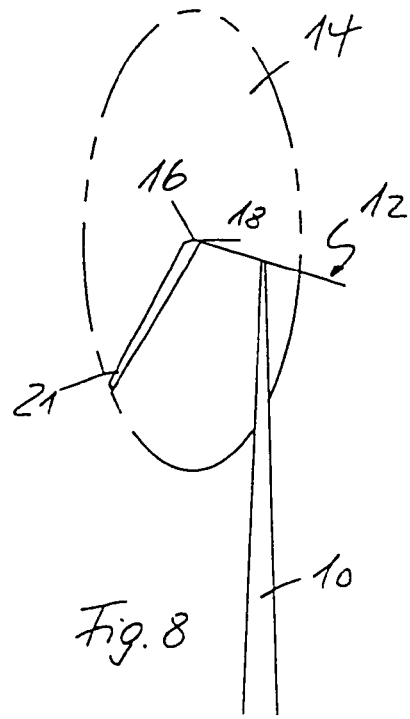
FIG. 8 shows the third step of the method according to the invention.

The next method step is shown in FIG. 8. There the rotor blade 21 is lowered into the 7 o'clock position. That lowering movement can be effected by the action of the force of gravity. At the same time the crane (not shown) which lifted the rotor blade 21 into the mounting position can act in opposite relationship to the rotary movement and thus impose a controlled rotary movement.

It can also be seen from this Figure that the rotor blade connection 18 is now in the 3 o'clock position and the rotor blade connection 16 is in the 11 o'clock position.

Figure 9:
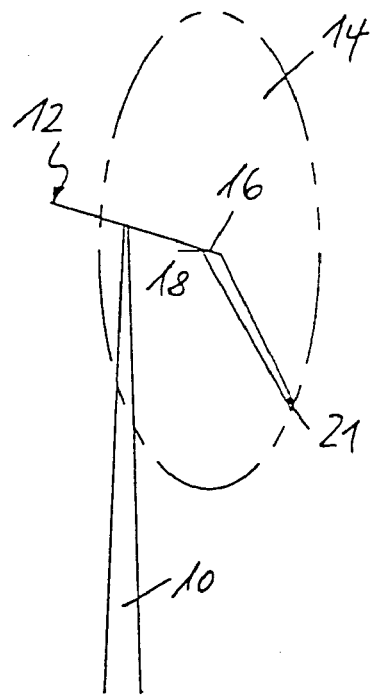
FIG. 9 shows the fourth step of the method according to the invention.

FIG. 9 clearly shows that, with the position of the rotor hub unchanged, the pod was rotated through 180 degrees so that the rotor circle 14 is in front of the pylon 10, in the viewing direction. By virtue of that rotary movement of the pod the rotor blade 21 is now in the 5 o'clock position, the rotor blade connection 16 is in the 1 o'clock position and the rotor blade 18 is in the 9 o'clock position. Accordingly a further rotor blade which was lifted by the crane in a horizontal position can now be fitted to that rotor blade connection 18 without the crane having to change its position.

Figure 10:
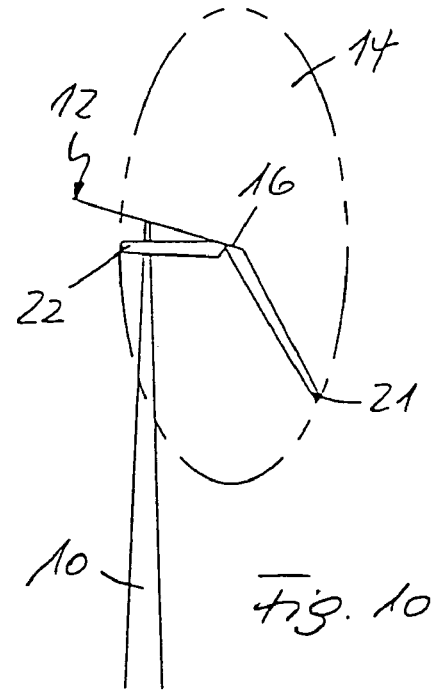
FIG. 10 shows the fifth step of the method according to the invention.

The situation which then results is shown in FIG. 10. There the rotor blade connection 16 is still in the 1 o'clock position, the first rotor blade 21 is in the 5 o'clock position while the second rotor blade 22 is now in the 9 o'clock position.

Figure 11:
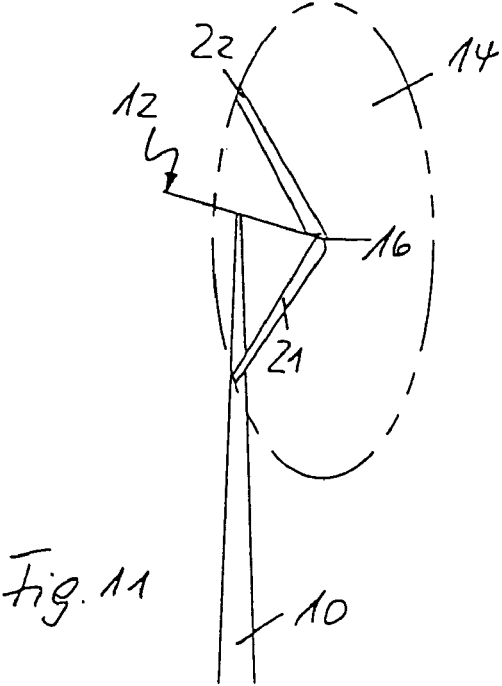
FIG. 11 shows the sixth step of the method according to the invention.

To prepare for mounting the third rotor blade, then, as shown in FIG. 11, the rotor blade 21 is pivoted out of the 5 o'clock position into the 7 o'clock position by means of the crane. As a consequence the second rotor blade 22 moves into the 11 o'clock position and the rotor blade connection 16 passes into the 3 o'clock position. Subsequently the pod is again rotated through 180 degrees.

Figure 12:
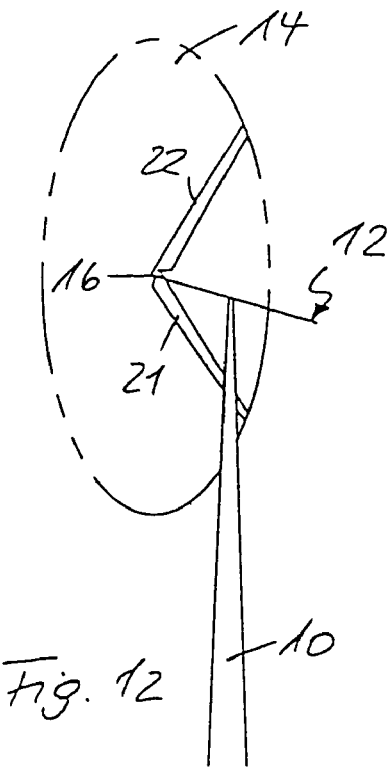
FIG. 12 shows the seventh step of the method according to the invention.
Figure 13:
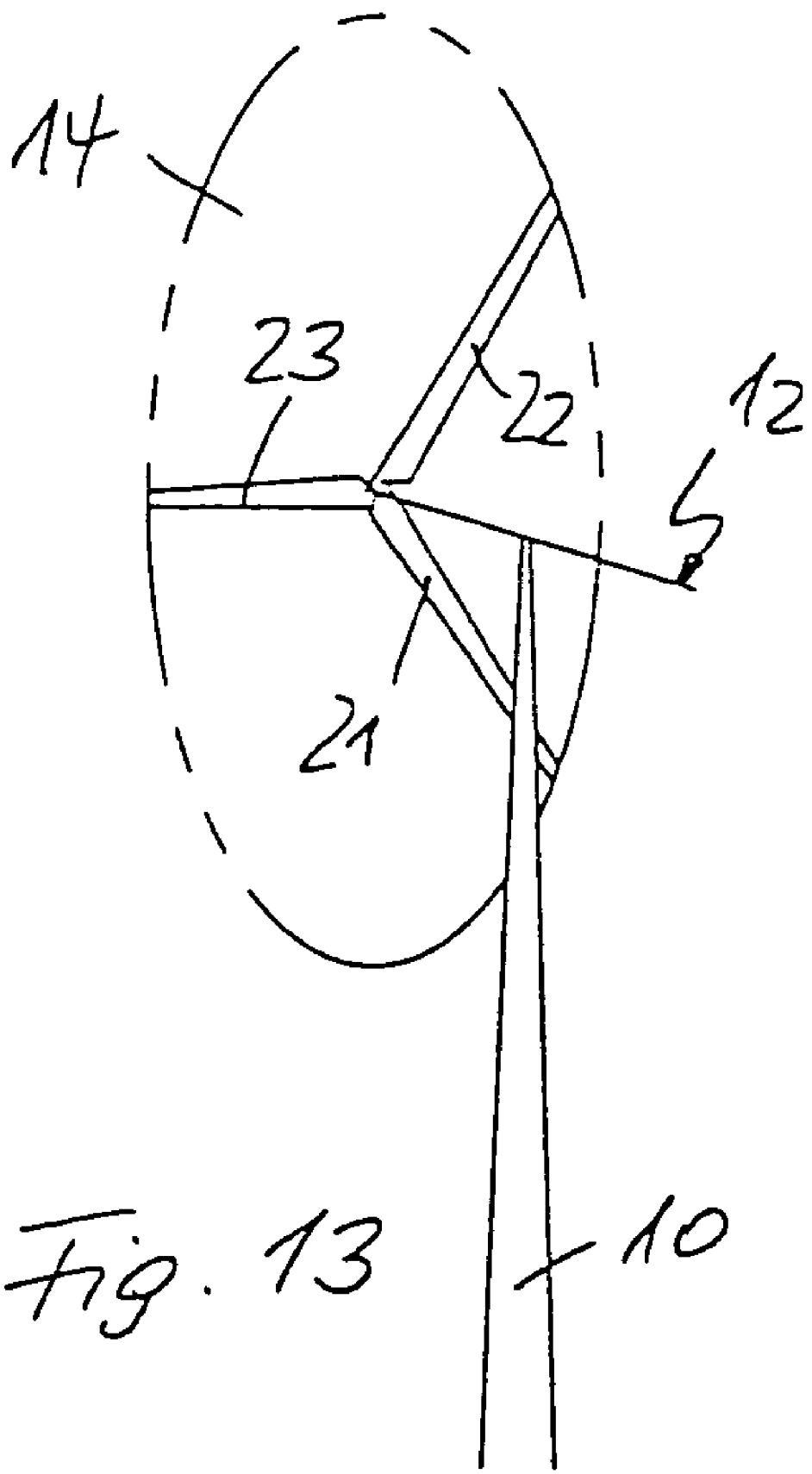
FIG. 13 shows the eighth step of the method according to the invention.

The result of that rotary movement is shown in FIG. 12. From the viewpoint of the observer the rotor circle 14 is now again disposed behind the pylon 10. As a consequence, with the rotor hub position unchanged, the first rotor blade 21 is in the 5 o'clock position, the second blade 22 is in the 1 o'clock position and the rotor blade connection 16 is in the 9 o'clock position. In that way a third rotor blade can be fitted to that rotor blade connection 16 once again without a change in the location of the crane. This is shown in FIG. 13. The first rotor blade 21 is in the 5 o'clock position, the second rotor blade 22 is in the 1 o'clock position and the third rotor blade 23 is in the 9 o'clock position. The method according to the invention is thus concluded and all three rotor blades are fitted to the wind power installation.

The invention claimed is:

1. A method of mounting rotor blades to a rotor hub of a wind power installation, wherein the rotor hub is connected to a pod, comprising:
    rotating the rotor hub into a predetermined first position;
    fitting a first rotor blade;
    rotating the rotor hub by means of the first rotor blade into a predetermined second position;
    rotating the pod 180 degrees from a first position with respect to a pylon to a second position with respect to the pylon before the second rotor blade is fitted;

mounting a second rotor blade, characterized in that the rotation of the rotor hub is effected in the direction of the effect of gravitational force of the first rotor blade.

2. The method according to claim 1 characterized in that a crane engages a rotor blade and assists with the rotary movement of the hub.

3. The method according to claim 2 characterized in that the crane engages a through hole in the rotor blade.

4. The method according to claim 1 characterized in that the rotor hub is rotated by means of the second rotor blade into a further predetermined position, the pod is again rotated through 180 degrees from the second position with respect to the pylon to the first position with respect to the pylon, and a third rotor blade is fitted.

* * * * *